(12) United States Patent
Wang et al.

(10) Patent No.: US 10,382,974 B2
(45) Date of Patent: *Aug. 13, 2019

(54) SPECTRUM SHARING METHOD AND APPARATUS THEREOF

(71) Applicant: Huawei Technologies Co., Ltd., Shenzhen, Guangdong (CN)

(72) Inventors: Zongjie Wang, Shenzhen (CN); Bingzhao Li, Beijing (CN); Yanyan Chen, Shenzhen (CN); Chuanfeng He, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 16/198,409

(22) Filed: Nov. 21, 2018

(65) Prior Publication Data

US 2019/0098508 A1    Mar. 28, 2019

Related U.S. Application Data

(63) Continuation of application No. 15/730,604, filed on Oct. 11, 2017, now Pat. No. 10,159,000, which is a continuation of application No. 14/996,721, filed on Jan. 15, 2016, now Pat. No. 9,820,161, which is a continuation of application No. PCT/CN2013/079587, filed on Jul. 18, 2013.

(51) Int. Cl.
*H04L 1/00* (2006.01)
*H04L 5/00* (2006.01)
*H04W 16/14* (2009.01)
*H04W 72/04* (2009.01)
*H04W 88/06* (2009.01)

(52) U.S. Cl.
CPC .......... *H04W 16/14* (2013.01); *H04L 5/0037* (2013.01); *H04L 5/0057* (2013.01); *H04W 72/0446* (2013.01); *H04L 1/0026* (2013.01); *H04L 5/0005* (2013.01); *H04W 88/06* (2013.01)

(58) Field of Classification Search
CPC ................ H04L 5/0057; H04W 16/14; H04W 72/0446; H04W 88/06
See application file for complete search history.

(56) References Cited

U.S. PATENT DOCUMENTS 9,820,161 B2 * 11/2017 Wang .................... H04L 5/0057
10,159,000 B2 * 12/2018 Wang .................... H04W 16/14
2007/0223508 A1 * 9/2007 Nandagopalan ...... H04W 16/14
370/431

(Continued)

FOREIGN PATENT DOCUMENTS

CN       1798319 A       7/2006
CN       101262702 A     9/2008
(Continued)

*Primary Examiner* — Kashif Siddiqui

(57) ABSTRACT

The present invention discloses a spectrum sharing method and apparatus thereof. The method includes: acquiring a cycle period of a shared frequency between a first system and a second system; obtaining time slice allocation information of the cycle period; and sending the time slice allocation information to a user equipment. By means of the foregoing manner, a shared frequency can be allocated, so that efficiency of transmitting system data can be effectively improved.

12 Claims, 3 Drawing Sheets

(56) References Cited

U.S. PATENT DOCUMENTS

| | | | | |
|---|---|---|---|---|
| 2012/0088516 A1* | 4/2012 | Ji | ............... | H04L 1/0027 455/452.1 |
| 2013/0210447 A1* | 8/2013 | Moe | ............... | H04W 72/0486 455/453 |
| 2013/0250764 A1* | 9/2013 | Vasudevan | ............ | H04W 16/14 370/235 |
| 2013/0322375 A1* | 12/2013 | Chang | ............... | H04W 72/0426 370/329 |
| 2014/0243005 A1* | 8/2014 | Yanover | ............... | H04L 5/0053 455/452.1 |

FOREIGN PATENT DOCUMENTS

| | | |
|---|---|---|
| CN | 101977388 A | 2/2011 |
| EP | 2595449 A1 | 5/2013 |

* cited by examiner

SPECTRUM SHARING METHOD AND APPARATUS THEREOF

CROSS-REFERENCE TO RELATED APPLICATIONS

This application is a continuation of U.S. patent application Ser. No. 15/730,604, filed on Oct. 11, 2017, which is a continuation of U.S. patent application Ser. No. 14/996,721, filed on Jan. 15, 2016, now U.S. Pat. No. 9,820,161, which is a continuation of International Patent Application No. PCT/CN2013/079587 filed on Jul. 18, 2013. All of the aforementioned applications are hereby incorporated by reference in their entireties.

TECHNICAL FIELD

The present invention relates to the field of communications technologies, and in particular, to a spectrum sharing method and apparatus thereof.

BACKGROUND

In the field of communications technologies, a spectrum resource is an important resource for a wireless communications system. During deployment by using an existing access technology, a corresponding frequency needs to be determined first. During deployment of a network by using an access technology, different frequencies are selected for an existing Universal Mobile Telecommunications System (UMTS) and a Long Term Evolution (LTE) system, so as to perform data transmission by using a spectrum resource. During data transmission of an existing system, a case of a shortage of spectrum resources that is caused by excessively heavy load of the system or a waste of spectrum resources that is caused by excessively light load of the system usually occurs, which easily results in unbalanced use of spectrum resources.

SUMMARY

In view of this, embodiments of the present invention provide a network side device, user equipment, and a spectrum sharing method thereof, so that a shared frequency can be allocated, according to load information of a first system and load information of a second system, to the first system or the second system to perform data transmission, thereby improving efficiency of transmitting system data.

A first aspect provides a spectrum sharing method, where the method includes: acquiring load information of a first system and load information of a second system; acquiring a cycle period of a shared frequency of the first system and the second system; obtaining time slice allocation information according to the load information of the first system, the load information of the second system, and the cycle period, where the time slice allocation information includes a first time slice and a second time slice; and sending the time slice allocation information to user equipment, so that the user equipment performs data transmission at the first time slice by using the first system and by using the shared frequency and performs data transmission at the second time slice by using the second system and by using the shared frequency.

With reference to the implementation manner of the first aspect, in a first possible implementation manner, the method further includes: receiving channel quality indication CQI information or precoding control indication PCI information that is generated according to the time slice allocation information and is sent by the user equipment, and monitoring, by using the CQI information or the PCI information, channel quality of data transmission performed by using the shared frequency.

With reference to the implementation manner of the first aspect, in a second possible implementation manner, the time slice allocation information includes at least one of a valid time, a valid range, and time slicing information.

With reference to the second possible implementation manner of the first aspect, in a third possible implementation manner, the valid range is a valid range of a set of cells in which time slices are allocated to be valid.

With reference to the implementation manner of the first aspect, in a fourth possible implementation manner, the sending the time slice allocation information to user equipment, so that the user equipment performs data transmission at the first time slice by using the first system and by using the shared frequency and performs data transmission at the second time slice by using the second system and by using the shared frequency includes: sending the time slice allocation information to a first network device or a second network device, and sending, by the first network device or the second network device, the time slice allocation information to the user equipment, so that the user equipment performs data transmission at the first time slice by using the first system and by using the shared frequency and performs data transmission at the second time slice by using the second system and by using the shared frequency.

With reference to the fourth possible implementation manner of the first aspect, in a fifth possible implementation manner, the first network device is one of a wireless network controller, a base station controller, and an evolved base station, and the second network device is one of an evolved base station, a wireless network controller, a base station controller, and an independent controller.

With reference to the implementation manner of the first aspect, in a sixth possible implementation manner, the first system is a Universal Mobile Telecommunications System UMTS, and the second system is a Long Term Evolution technology LTE system.

A second aspect provides a network side device, where the network side device includes a second network device, and the second network device includes a receiving unit, a processing unit, and a sending unit, where the receiving unit acquires load information of a first system and load information of a second system; the receiving unit acquires a cycle period of a shared frequency of the first system and the second system; the processing unit obtains time slice allocation information according to the load information of the first system, the load information of the second system, and the cycle period, where the time slice allocation information includes a first time slice and a second time slice; and the sending unit sends the time slice allocation information to user equipment, so that the user equipment performs data transmission at the first time slice by using the first system and by using the shared frequency and performs data transmission at the second time slice by using the second system and by using the shared frequency.

With reference to the implementation manner of the second aspect, in a first possible implementation manner, the receiving unit receives CQI information or PCI information that is generated according to the time slice allocation information and is sent by the user equipment, and the processing unit monitors, by using the CQI information or the PCI information, channel quality of data transmission performed by using the shared frequency.

With reference to the implementation manner of the second aspect, in a second possible implementation manner, the time slice allocation information includes at least one of a valid time, a valid range, and time slicing information.

With reference to the second possible implementation manner of the second aspect, in a third possible implementation manner, the valid range is a valid range of a set of cells in which time slices are allocated to be valid.

With reference to the implementation manner of the second aspect, in a fourth possible implementation manner, the sending unit sends the time slice allocation information to a first network device or the second network device, and the first network device or the second network device sends the time slice allocation information to the user equipment, so that the user equipment performs data transmission at the first time slice by using the first system and by using the shared frequency and performs data transmission at the second time slice by using the second system and by using the shared frequency.

With reference to the fourth possible implementation manner of the second aspect, in a fifth possible implementation manner, the first network device is one of a wireless network controller, a base station controller, and an evolved base station, and the second network device is one of an evolved base station, a wireless network controller, a base station controller, and an independent controller.

With reference to the implementation manner of the second aspect, in a sixth possible implementation manner, the first system is a UNITS, and the second system s an LTE system.

A third aspect provides a spectrum sharing method, where the method includes: receiving time slice allocation information, where the time slice allocation information includes a first time slice and a second time slice, and the time slice allocation information is generated according to load information of a first system, load information of a second system, and a cycle period of a shared frequency of the first system and the second system; and sending the time slice allocation information to user equipment, so that the user equipment performs data transmission at the first time slice by using the first system and by using the shared frequency and performs data transmission at the second time slice by using the second system and by using the shared frequency.

With reference to the implementation manner of the third aspect, in a first possible implementation manner, the method further includes: receiving CQI information or PCI information that is generated according to the time slice allocation information and is sent by the user equipment, and monitoring, by using the CQI information or the PCI information, channel quality of data transmission performed by using the shared frequency.

With reference to the implementation manner of the third aspect, in a second possible implementation manner, the time slice allocation information includes at least one of a valid time, a valid range, and time slicing information.

With reference to the second possible implementation manner of the third aspect, in a third possible implementation manner, the valid range is a valid range of a set of cells in which time slices are allocated to be valid.

With reference to the implementation manner of the third aspect, in a fourth possible implementation manner, the first system is a UMTS, and the second system is an LTE system A fourth aspect provides a network side device, where the network side device includes a first network device, and the first network device includes a receiving unit, a processing unit, and a sending unit, where the receiving unit receives time slice allocation information, where the time slice allocation information includes a first time slice and a second time slice, the time slice allocation information is generated according to load information of a first system, load information of a second system, and a cycle period of a shared frequency of the first system and the second system, and the sending unit sends the time slice allocation information to user equipment, so that the user equipment performs data transmission at the first time slice by using the first system and by using the shared frequency and performs data transmission at the second time slice by using the second system and by using the shared frequency.

With reference to the implementation manner of the fourth aspect, in a first possible implementation manner, the receiving unit receives CQI information or PCI information that is generated according to the time slice allocation information and is sent by the user equipment, and the processing unit monitors, by using the CQI information or the PCI information, channel quality of data transmission performed by using the shared frequency.

With reference to the implementation manner of the fourth aspect, in a second possible implementation manner, the time slice allocation information includes at least one of a valid time, a valid range, and time slicing information.

With reference to the second possible implementation manner of the fourth aspect, in a third possible implementation manner, the valid range is a valid range of a set of cells in which time slices are allocated to be valid.

With reference to the implementation manner of the fourth aspect, in a fourth possible implementation manner, the first system is a UNITS, and the second system is an LTE system.

A fifth aspect provides a spectrum sharing method, where the method includes: receiving time slice allocation information, where the time slice allocation information includes a first time slice and a second time slice, and the time slice allocation information is generated according to load information of a first system, load information of a second system, and a cycle period of a shared frequency of the first system and the second system; performing data transmission at the first time slice by using the first system and by using the shared frequency; and performing data transmission at the second time slice by using the second system and by using the shared frequency.

With reference to the implementation manner of the fifth aspect, in a first possible implementation manner, the method further includes: generating CQI information or PCI information according to the time slice allocation information, and sending the CQI information or the PCI information to a first network device or a second network device.

With reference to the first possible implementation manner of the fifth aspect, in a second possible implementation manner, the first network device is one of a wireless network controller, a base station controller, and an evolved base station, and the second network device is one of an evolved base station, a wireless network controller, a base station controller, and an independent controller.

With reference to the implementation manner of the fifth aspect, in a third possible implementation manner, the time slice allocation information includes at least one of a valid time, a valid range, and time slicing information.

With reference to the third possible implementation manner of the fifth aspect, in a fourth possible implementation manner, the valid range is a valid range of a set of cells in which time slices are allocated to be valid.

With reference to the implementation manner of the fifth aspect, in a fifth possible implementation manner, the first system is a UMTS, and the second system is an LTE system.

A sixth aspect provides user equipment, the user equipment including a receiving unit, a processing unit, and a sending unit, where the receiving unit receives time slice allocation information, where the time slice allocation information includes a first time slice and a second time slice, and the time slice allocation information is generated according to load information of a first system, load information of a second system, and a cycle period of a shared frequency of the first system and the second system; the user equipment performs data transmission at the first time slice by using the first system and by using the shared frequency; and the user equipment performs data transmission at the second time slice by using the second system and by using the shared frequency.

With reference to the implementation manner of the sixth aspect, in a first possible implementation manner, the processing unit generates CQI information or PCI information according to the time slice allocation information, and the sending unit sends the CQI information or the PCI information to a first network device or a second network device.

With reference to the first possible implementation manner of the sixth aspect, in a second possible implementation manner, the first network device is one of a wireless network controller, a base station controller, and an evolved base station, and the second network device is one of an evolved base station, a wireless network controller, a base station controller, and an independent controller.

With reference to the implementation manner of the sixth aspect, in a third possible implementation manner, the time slice allocation information includes at least one of a valid time, a valid range, and time slicing information.

With reference to the third possible implementation manner of the sixth aspect, in a fourth possible implementation manner, the valid range is a valid range of a set of cells in which time slices are allocated to be valid.

With reference to the implementation manner of the sixth aspect, in a fifth possible implementation manner, the first system is a UMTS, and the second system is an LTE system.

By means of the foregoing solutions, beneficial effects of the present invention are as follows: In the present invention, a second network device obtains time slice allocation information according to load information of a first system, load information of a second system, and a cycle period of a shared frequency of the first system and the second system, and a first network device or the second network device sends the time slice allocation information to user equipment, where the time slice allocation information includes a first time slice and a second time slice, so that the user equipment performs data transmission at the first time slice by using the first system and by using the shared frequency and performs data transmission at the second time slice by using the second system and by using the shared frequency, thereby effectively improving efficiency of transmitting system data.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts. Where.

DETAILED DESCRIPTION

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
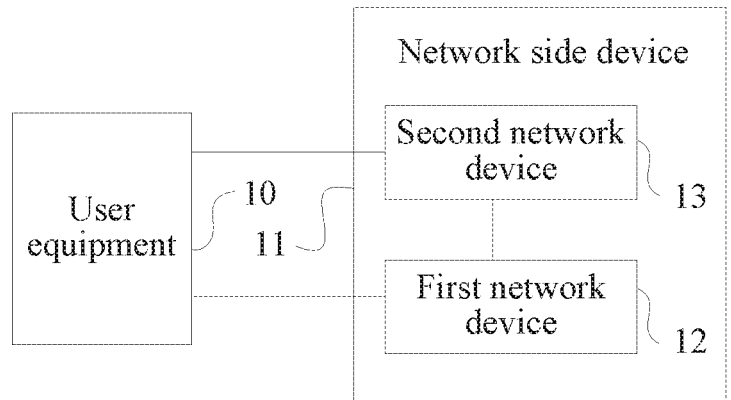
FIG. 1 is a schematic structural diagram of a communications system according to a first embodiment of the present invention.

Refer to FIG. 1, which is a schematic structural diagram of a communications system according to a first embodiment of the present invention. The communications system includes user equipment 10 and a network side device 11. The network side device 11 performs data transmission with the user equipment 10 by using a first system or a second system.

In this embodiment, the network side device 11 is provided with a shared frequency of the first system and the second system, so that the first system performs data transmission by using the shared frequency, or the second system performs data transmission by using the shared frequency. Optionally, the first system is a UMTS, and the second system is an LTE system. In other embodiments, the first system is an LTE system, and the second system is a UMTS. Alternatively, the first system and the second system may be a combination of an LTE system, a UMTS, and a Global System for Mobile Communications (GSM) and other communications systems; for example, the first system is a GSM, and the second system is a UMTS.

The network side device 11 includes a first network device 12 and a second network device 13. When the network side device 11 performs data transmission with the user equipment 10, the second network device 13 first acquires load information of the first system and load information of the second system, and acquires a cycle period of the shared frequency of the first system and the second system, and the second network device 13 then obtains time slice allocation information according to the load information of the first system, the load information of the second system, and the cycle period, where the time slice allocation information includes a first time slice and a second time slice. In this embodiment, the second network device 13 preferably slices the cycle period into the first time slice and the second time slice according to a proportion of load of the first system to load of the second system. For example, the proportion of the load of the first system to the load of the second system is 1:2, so that a proportion of the first time slice to the second time slice is 1:2. In addition, the second network device 13 may determine valid times of the first time slice and the second time slice within the cycle period according to the proportion of the load of the first system to the load of the second system, where the valid time may be a specific time point. In other embodiments, the second network device 13 obtains the time slice allocation information according to the load information of the first system, the load information of the second system, and the cycle period in other manners, for example, by using a formula algorithm.

After the second network device 13 generates the time slice allocation information, the second network device 13 sends the time slice allocation information to the first network device 12 or the second network device 13, and the first network device 12 or the second network device 13 sends the time slice allocation information to the user equipment 10. After the user equipment 10 receives the time slice allocation information, according to the time slice allocation information, the user equipment 10 performs, data transmission at the first time slice by using the first system and by using the shared frequency and performs data transmission at the second time slice by using the second system and by using the shared frequency. In addition, the user equipment 10 generates channel quality indication (CQI) information or preceding control indication (PCI) information according to the time slice allocation information, and sends the CQI information or the PCI information to the first network device 12 or the second network device 13, so as to feed back, to the first network device 12 or the second network device 13, channel quality of data transmission performed by the user equipment 10 at the first time slice or the second time slice by using the shared frequency.

In this embodiment, the time slice allocation information further includes at least one of a valid time, a valid range, and time slicing information. A valid time point of a time slice within the cycle period may be determined by using the valid time, and additionally the valid time point of the time slice may be controlled by changing the valid time. The valid range is a valid range of a set of cells in which time slices are allocated to be valid, and user equipment 10 of a cell in which a time slice is allocated to be valid and that may be determined by using the valid range transmits data by using the shared frequency. The second network device 13 slices the cycle period into the first time slice and the second time slice by using the time slicing information.

In this embodiment, a second network device obtains time slice allocation information according to load information of a first system, load information of a second system, and a cycle period of a shared frequency of the first system and the second system, and sends the time slice allocation information to user equipment, where the time slice allocation information includes a first time slice and a second time slice, so that the user equipment performs data transmission at the first e slice by using the first system and by using the shared frequency and performs data transmission at the second time slice by using the second system and by using the shared frequency, thereby effectively improving efficiency of transmitting system data.

Figure 2:
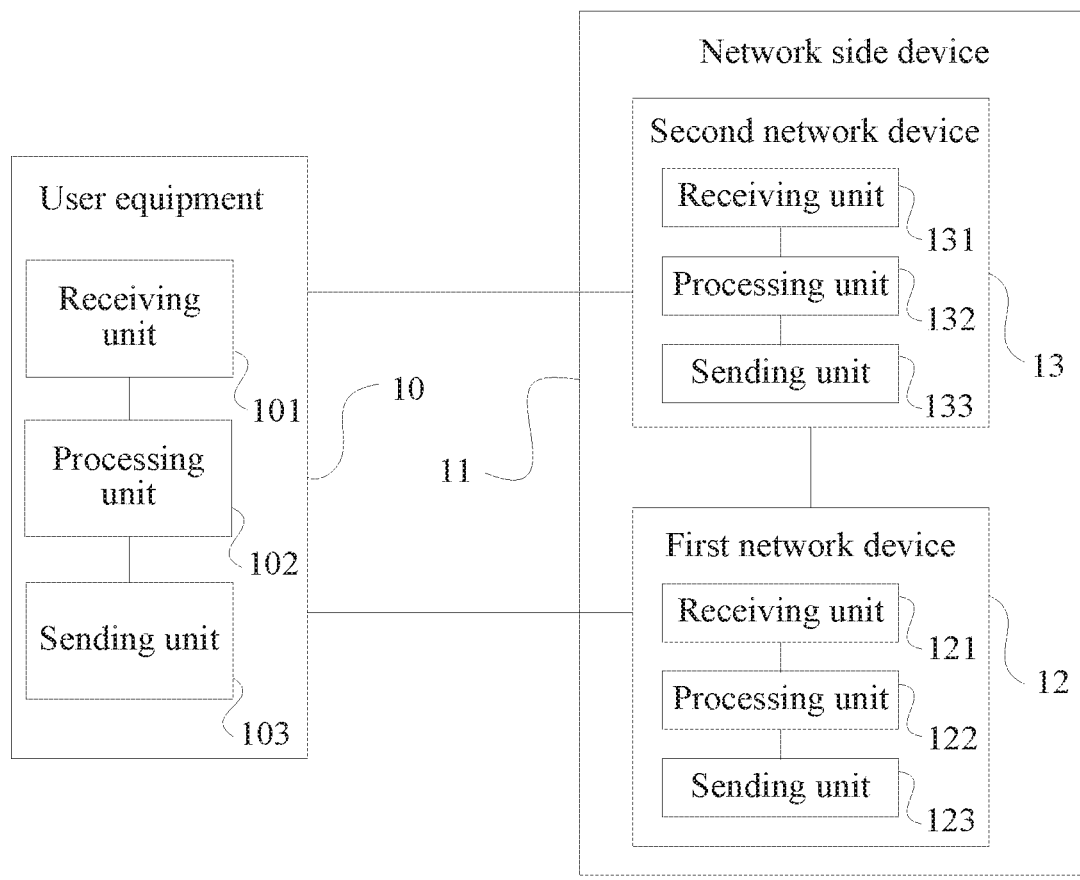
FIG. 2 is a schematic structural diagram of a communications system according to a second embodiment of the present invention.

The present invention further provides a communications system according to a second embodiment, which is described in detail on the basis of the communications system disclosed in the first embodiment. As shown in FIG. 2, the first network device 12 includes a receiving unit 121, a processing unit 122, and a sending unit 123. The second network device 13 includes a receiving unit 131, a processing unit 132, and a sending unit 133. The user equipment 10 includes a receiving unit 101, a processing unit 102, and a sending unit 103.

In this embodiment, the receiving unit 131 of the second network device 13 first acquires load information of a first system and load information of a second system, and acquires a cycle period of a shared frequency of the first system and the second system, and then the processing unit 132 of the second network device 13 obtains time slice allocation information according to the load information of the first system, the load information of the second system, and the cycle period, where the time slice allocation information includes a first time slice and a second time slice.

After the processing unit 132 generates the time slice allocation information, the sending unit 133 of the second network device 13 sends the time slice allocation information to the first network device 12. After the receiving unit 121 of the first network device 12 or the receiving unit 131 of the second network device 13 receives the time slice allocation information, the sending unit 123 of the first network device 12 or the sending unit 133 of the second network device 13 sends the time slice allocation information to the user equipment 10. After the receiving unit 101 of the user equipment 10 receives the time slice allocation information, according to the time slice allocation information, the user equipment 10 performs data transmission at the first time slice by using the first system and by using the shared frequency and performs data transmission at the second time slice by using the second system and by using the shared frequency. In addition, the processing unit 102 of the user equipment 10 generates CQI information or PCI information according to the time slice allocation information, and the sending unit 103 of the user equipment 10 sends the CQI information or the PCI information to the receiving unit 121 of the first network device 12 or the receiving unit 131 of the second network device 13, so as to feed back, to the first network device 12 or the second network device 13, channel quality of data transmission performed by the user equipment 10 at the first time slice or the second time slice by using the shared frequency.

The present invention further provides a communications system according to a third embodiment, which is described in detail on the basis of the communications systems disclosed in the first embodiment and the second embodiment. In this embodiment, the first network device 12 is one of a wireless network controller, a base station controller, and an evolved base station, and the second network device 13 is one of an evolved base station, a wireless network controller, a base station controller, and an independent controller.

When the second network device 13 is an independent controller, the second network device 13 is configured to obtain time slice allocation information according to load information of a first system, load information of a second system, and a cycle period, and send the time slice allocation information to the first network device 12, so as to send the time slice allocation information to the user equipment 10 by using the first network device 12. The user equipment 10 generates CQI information or PCI information according to the time slice allocation information, and sends the CQI information or the PCI information to the first network device 12, so as to feed back, to the first network device 12, channel quality of data transmission performed by the user equipment 10 at a first time slice or a second time slice by using a shared frequency.

When the second network device 13 is an evolved base station, a wireless network controller, or a base station controller, the second network device 13 is configured to obtain time slice allocation information according to load information of a first system, load information of a second system, and a cycle period, and send the e slice allocation information to the first network device 12 or the second network device 13, so as to send the time slice allocation information to the user equipment 10 by using the first network device 12 or the second network device 13. The user equipment 10 generates CQI information or PCI information according to the time slice allocation information, and sends the CQI information or the PCI information to the first network device 12 or the second network device 13, so as to feed back, to the first network device 12 or the second network device 13, channel quality of data transmission performed by the user equipment 10 at a first time slice or a second time slice by using a shared frequency.

Figure 3:
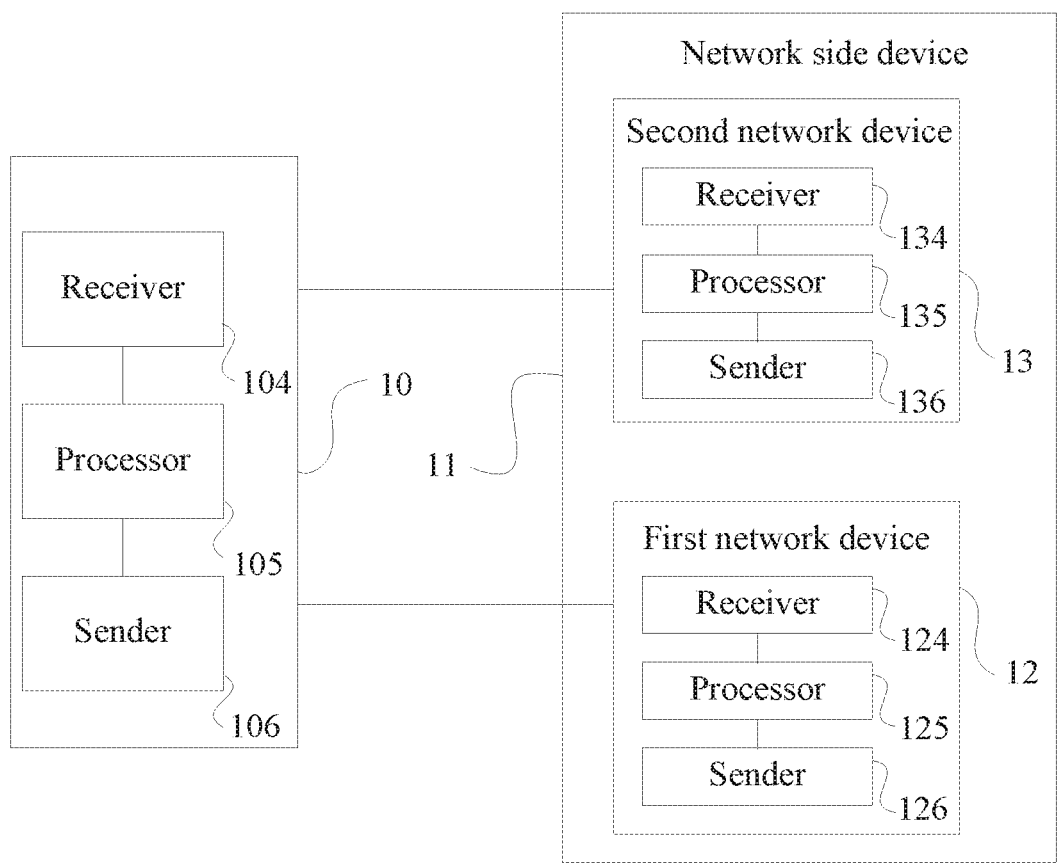
FIG. 3 is a schematic structural diagram of a communications system according to a third embodiment of the present invention.

The present invention further provides a communications system according to a fourth embodiment, which is described in detail on the basis of the communications system disclosed in the first embodiment. As shown in FIG. 3, the first network device 12 includes a receiver 124, a processor 125, and a sender 126. The second network device 13 includes a receiver 134, a processor 135, and a sender 136. The user equipment 10 includes a receiver 104, a processor 105, and a sender 106.

In this embodiment, the receiver 134 of the second network device 13 first acquires load information of a first system and load information of a second system, and acquires a cycle period of a shared frequency of the first system and the second system and then the processor 135 of the second network device 13 obtains time slice allocation information according to the load information of the first system, the load information of the second system, and the cycle period, where the time slice allocation information includes a first time slice and a second time slice.

After the processor 135 generates the time slice allocation information, the sender 136 of the second network device 13 sends the time slice allocation information to the first network device 12. After the receiver 124 of the first network device 12 or the receiver 134 of the second network device 13 receives the time slice allocation information, the sender 126 of the first network device 12 or the sender 136 of the second network device 13 sends the time slice allocation information to the user equipment 10. After the receiver 104 of the user equipment 10 receives the time slice allocation information, according to the time slice allocation information, the user equipment 10 performs data transmission at the first time slice by using the first system and by using the shared frequency and performs data transmission at the second time slice by using the second system and by using the shared frequency. In addition, the processor 105 of the user equipment 10 generates CQI information or PCI information according to the time slice allocation information. The sender 106 of the user equipment 10 sends the CQI information or the PCI information to the receiver 124 of the first network device 12 or the receiver 134 of the second network device 13, so as to feed back channel quality of data transmission performed by the user equipment 10 at the first time slice or the second time slice by using the shared frequency.

Figure 4:
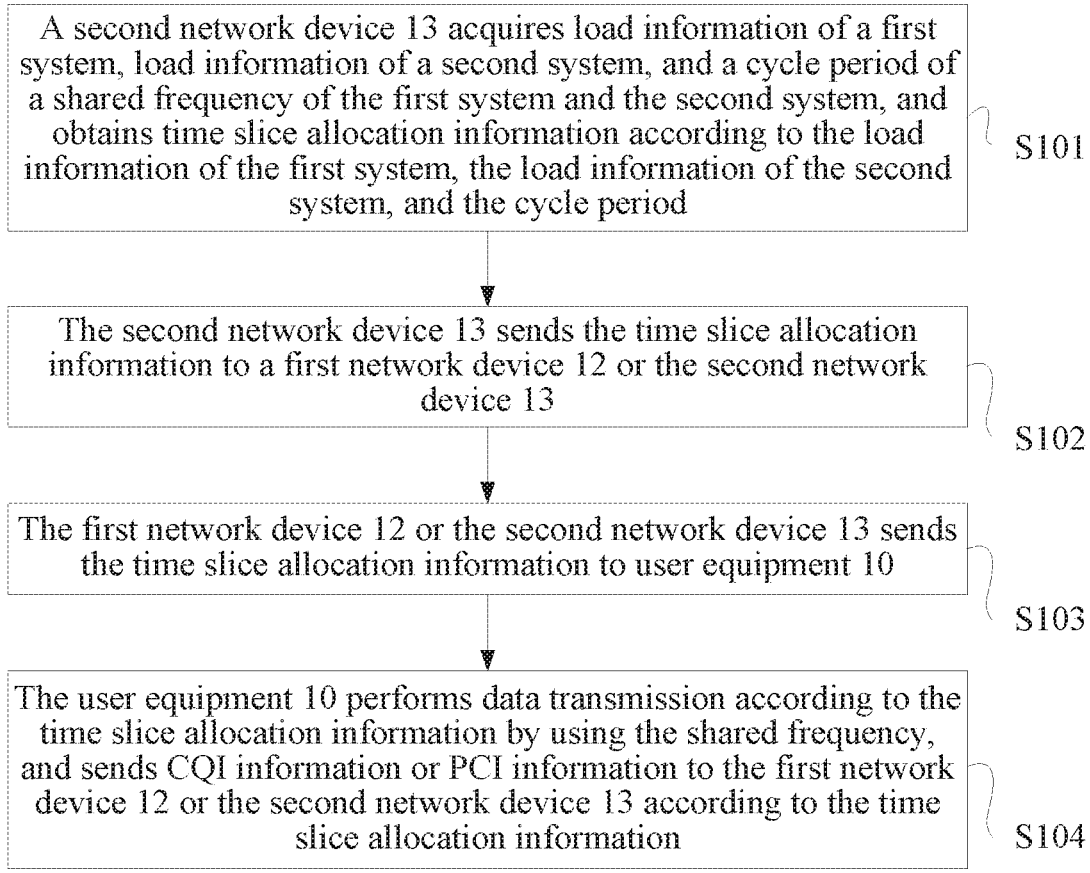
FIG. 4 is a flowchart of a spectrum sharing method according to a first embodiment of the present invention.

Further, the present invention further provides a spectrum sharing method according to a first embodiment, which is described in detail on the basis of the communications system disclosed in the first embodiment. As shown in FIG. 4, FIG. 4 is a flowchart of the spectrum sharing method according to the first embodiment of the present invention. The spectrum sharing method disclosed in this embodiment includes the following steps:

Step S101: The second network device 13 acquires load information of a first system, load information of a second system, and a cycle period of a shared frequency of the first system and the second system, and obtains time slice allocation information according to the load information of the first system, the load information of the second system, and the cycle period.

Step S102: The second network device 13 sends the time slice allocation information to the first network device 12 or the second network device 13.

Step S103: The first network device 12 or the second network device 13 sends the time slice allocation information to the user equipment 10.

Step S104: The user equipment 10 performs data transmission according to the time slice allocation information by using the shared frequency, and sends CQI information or PCI information to the first network device 12 or the second network device 13 according to the time slice allocation information.

In step S101, the time slice allocation information includes a first time slice, a second time slice, a valid time, a valid range, or time slicing information. Preferably, the first system is a UMTS, and the second system is an LTE system. The second network device 13 first acquires the load information of the first system and the load information of the second system, and acquires the cycle period of the shared frequency of the first system and the second system, and then the second network device 13 obtains the time slice allocation information according to the load information of the first system, the load information of the second system, and the cycle period. In this embodiment, the second network device 13 preferably slices the cycle period into the first time slice and the second time slice according to a proportion of load of the first system to load of the second system. For example, the proportion of the load of the first system to the load of the second system is 1:2, so that a proportion of the first time slice to the second time slice is 1:2. In addition, the second network device 13 may determine valid times of the first time slice and the second time slice within the cycle period according to the proportion of the load of the first system to the load of the second system, where the valid time may be a specific time point. In another embodiment, the second network device 13 obtains the time slice allocation information according to the load information of the first system, the load information of the second system, and the cycle period in another manner, for example, by using a formula algorithm.

In step S104, after the user equipment 10 receives the time slice allocation information, according to the time slice allocation information, the user equipment 10 performs data transmission at the first time slice by using the first system and by using the shared frequency and performs data transmission at the second time slice by using the second system and by using the shared frequency. In addition, the user equipment 10 generates the CQI information or the PCI information according to the time slice allocation information, and sends the CQI information or the PCI information to the first network device 12 or the second network device 13, so as to feed back, to the first network device 12 or the second network device 13, channel quality of data transmission performed by the user equipment 10 at the first time slice or the second time slice by using the shared frequency.

In this embodiment, a valid time point of a time slice within the cycle period may be determined by using the valid time, and additionally the valid time point of the time slice may be controlled by changing the valid time. The valid range is a valid range of a set of cells in which time slices are allocated to be valid, and user equipment 10 of a cell in which a time slice is allocated to be valid and that may be determined by using the valid range transmits data by using the shared frequency. The second network device 13 slices the cycle period into the first time slice and the second time slice by using the time slicing information.

In conclusion, in the present invention, a second network device obtains time slice allocation information according to load information of a first system, load information of a second system, and a cycle period of a shared frequency of the first system and the second system, and a first network device or the second network device sends the time slice allocation information to user equipment, where the time slice allocation information includes a first time slice and a second time slice, so that the user equipment performs data transmission at the first time slice by using the first system and by using the shared frequency and performs data transmission at the second time slice by using the second system and by using the shared frequency, thereby effectively improving efficiency of transmitting system data.

The foregoing descriptions are merely embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

What is claimed is:

1. An apparatus, comprising:
   at least one processor; and
   a non-transitory computer-readable storage medium storing a program to be executed by the at least one processor, the program including instructions which, when executed by the at least one processor, cause the apparatus to:
      receive time slice allocation information of a cycle period of a shared frequency between a first system and a second system, wherein the time slice allocation information comprises a first time slice for the first system and a second time slice for the second system, the first system is a long term evolution (LTE) system, and the second system is a system different from the LTE system,
      perform data transmission at the first time slice of the shared frequency by using the first system, and
      perform data transmission at the second time slice of the shared frequency by using the second system.

2. The apparatus according to claim 1, wherein the time slice allocation information further comprises at least one of a valid time, and a valid range.

3. The apparatus according to claim 2, wherein the valid range is a valid range of a set of cells in which time slices are allocated to be valid.

4. An apparatus, comprising:
   at least one processor; and
   a non-transitory computer-readable storage medium storing a program to be executed by the at least one processor, the program including instructions which, when executed by the at least one processor, cause the apparatus to:
      acquire a cycle period of a shared frequency between a first system and a second system,
      obtain time slice allocation information of the cycle period,
      send the time slice allocation information to a user equipment, and
      wherein the time slice allocation information comprises a first time slice and a second time slice, the first time slice is for transmitting data on the shared frequency by using the first system, the second time slice is for transmitting data on the shared frequency by using the second system, the first system is a long term evolution (LTE) system, and the second system is a system different from the LTE system.

5. The apparatus according to claim 4, wherein the time slice allocation information further comprises at least one of a valid time, and a valid range.

6. The apparatus according to claim 5, wherein the valid range is a valid range of a set of cells in which time slices are allocated to be valid.

7. A non-transitory computer-readable storage medium storing a program which, when executed by a processor within a device, causes the device to:
   receive time slice allocation information of a cycle period of a shared frequency between a first system and a second system, wherein the time slice allocation information comprises a first time slice for the first system and a second time slice for the second system, the first system is a long term evolution (LTE) system, and the second system is a system different from the LTE system;
   perform data transmission at the first time slice of the shared frequency by using the first system; and
   perform data transmission at the second time slice of the shared frequency by using the second system.

8. The non-transitory computer-readable storage medium according to claim 7, wherein the time slice allocation information further comprises at least one of a valid time, and a valid range.

9. The non-transitory computer-readable storage medium according to claim 8, wherein the valid range is a valid range of a set of cells in which time slices are allocated to be valid.

10. A communications system, comprising:
    a network side device, configured to:
       acquire a cycle period of a shared frequency between a first system and a second system;
       obtain time slice allocation information of the cycle period; and
       send the time slice allocation information to a user equipment, wherein the time slice allocation information comprises a first time slice and a second time slice, the first system is a long term evolution (LTE) system, and the second system is a system different from the LTE system; and
    the user equipment, configured to:
       receive the time slice allocation information;
       perform data transmission at the first time slice of the shared frequency by using the first system; and
       perform data transmission at the second time slice of the shared frequency by using the second system.

11. The communications system according to claim 10, wherein the time slice allocation information further comprises at least one of a valid time, and a valid range.

12. The communications system according to claim 11, wherein the valid range is a valid range of a set of cells in which time slices are allocated to be valid.

* * * * *